United States Patent
Dong

(10) Patent No.: US 11,049,097 B2
(45) Date of Patent: Jun. 29, 2021

(54) SERVICE DATA PROCESSING METHOD, APPARATUS, AND ELECTRONIC DEVICE

(71) Applicant: Advanced New Technologies Co., Ltd., George Town (KY)

(72) Inventor: Rui Dong, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/886,235

(22) Filed: May 28, 2020

(65) Prior Publication Data

US 2020/0294036 A1   Sep. 17, 2020

Related U.S. Application Data

(63) Continuation of application No. PCT/CN2019/073823, filed on Jan. 30, 2019.

(30) Foreign Application Priority Data

Apr. 4, 2018 (CN) .......................... 201810301193.2

(51) Int. Cl.
*G06Q 20/38* (2012.01)
(52) U.S. Cl.
CPC .................. *G06Q 20/382* (2013.01)
(58) Field of Classification Search
None
See application file for complete search history.

(56) References Cited

U.S. PATENT DOCUMENTS 8,423,466 B2 * 4/2013 Lanc ................. G06Q 20/40
  705/44
9,313,215 B2 * 4/2016 Kalgi ................. G06F 21/604
(Continued)

FOREIGN PATENT DOCUMENTS

CN   101610315   12/2009
CN   104115178   10/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Diane L Lo
(74) *Attorney, Agent, or Firm* — Fish & Richardson P.C.

(57) ABSTRACT

One or more computing devices obtains service data of a user payment service. The one or more computing devices determines whether the service data of the user payment service falls within a service indicator range. In response to determining that the service data does not fall within the service indicator range, the one or more computing devices obtains location information of a target customer corresponding to the service data. The one or more computing devices obtains one or more local events corresponding to the location information. The one or more computing devices determines, based on the one or more local events, whether to output an alarm for the service data. In response to determining to output the alarm for the service data, the one or more computing devices outputs the alarm for the service data.

20 Claims, 5 Drawing Sheets

(56) References Cited

U.S. PATENT DOCUMENTS

| | | | |
|---|---|---|---|
| 9,972,011 B2* | 5/2018 | Hey | G06Q 20/4016 |
| 10,504,116 B2* | 12/2019 | Collinge | G06Q 20/327 |
| 2010/0131443 A1* | 5/2010 | Agarwal | H04L 67/32 |
| | | | 706/46 |
| 2014/0129505 A1* | 5/2014 | Lin | G06Q 50/01 |
| | | | 706/50 |
| 2015/0157943 A1 | 6/2015 | Li et al. | |
| 2016/0055431 A1 | 2/2016 | Howe | |
| 2016/0086284 A1* | 3/2016 | Ghosh | G06Q 40/08 |
| | | | 705/4 |
| 2018/0211267 A1* | 7/2018 | Gerard | G06Q 30/0202 |

FOREIGN PATENT DOCUMENTS

| | | |
|---|---|---|
| CN | 104799518 | 7/2015 |
| CN | 104065634 | 8/2015 |
| CN | 105991609 | 10/2016 |
| CN | 106097663 | 11/2016 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/073823, dated May 9, 2019, 9 pages (with partial English translation).

PCT International Preliminary Report on Patentability in International Application No. PCT/CN2019/073823, dated Oct. 6, 2020, 7 pages (with English translation).

* cited by examiner

US 11,049,097 B2

SERVICE DATA PROCESSING METHOD, APPARATUS, AND ELECTRONIC DEVICE

CROSS-REFERENCE TO RELATED APPLICATIONS

This application is a continuation of PCT Application No. PCT/CN2019/073823, filed on Jan. 30, 2019, which claims priority to Chinese Patent Application No. 201810301193.2, filed on Apr. 4, 2018, and each application is hereby incorporated by reference in its entirety.

TECHNICAL FIELD

The present specification relates to the field of payment technologies, and in particular, to service data processing methods, apparatuses, and electronic devices.

BACKGROUND

With continuous development of Internet technologies, mobile payment technologies are rapidly developing, and corresponding mobile payment services are increasingly accepted in people's lives, which gradually becomes main payment methods and bring much convenience to people.

With more and more mobile payment services being used, security measures and troubleshooting of mobile payment services are becoming more and more important. Nowadays, service data of the mobile payment services is monitored, and alarms are given for abnormal service data. After the alarms are given, monitoring personnel and assurance specialists follow up the abnormal service, for example, communicating with customers on site to understand abnormality causes to take corrective measures. This needs a large amount of manpower and material resources. Especially, when data alarms of the mobile payment services are inaccurate, human resources will be wasted. A new method is urgently needed to improve alarm accuracy of the service data.

SUMMARY

Implementations of the present specification provide service data processing methods, apparatuses, and electronic devices, so as to implement secondary check on payment data of a payment service, and improve alarm accuracy of payment service data.

According to a first aspect, an implementation of the present specification provides a service data processing method, where the method includes: obtaining service data of a user payment service and determining whether the service data of the user payment service falls within a service indicator range; if the service data does not fall within the service indicator range, obtaining location information of a target customer corresponding to the service data; obtaining one or more local events corresponding to the location information; and determining, based on the one or more local events, whether to give an alarm for the service data.

Optionally, determining, based on the one or more local events, whether to give an alarm for the service data includes: determining whether the one or more local events include a predetermined event; and if the one or more local events include a predetermined event, determining, based on the predetermined event, whether to give an alarm for the service data.

Optionally, determining, based on the predetermined event, whether to give an alarm for the service data includes: determining whether a level and/or duration of the predetermined event included in the one or more local events satisfy a predetermined condition; and if the level and/or the duration of the predetermined event included in the one or more local events satisfy the predetermined condition, determining that the service data fluctuates normally, and an alarm is not given for the service data; or if the level and/or the duration of the predetermined event included in the one or more local events do not satisfy the predetermined condition, determining that the service data is abnormal, and giving an alarm for the service data.

Optionally, the method further includes: if the one or more local events do not include the predetermined event, giving an alarm for the service data; or suspending the user payment service.

Optionally, the predetermined event includes: natural disasters, traffic control and/or parades.

Optionally, the method further includes: if the one or more local events include a predetermined event, generating prompt information based on the predetermined event, and displaying the prompt information.

Optionally, the method further includes: searching and obtaining local news corresponding to the location information; and obtaining one or more events of predetermined types from the local news as the one or more local events.

According to a second aspect, an implementation of the present specification provides a service data processing apparatus, where the apparatus includes: a determining unit, configured to obtain service data of a user payment service and determine whether the service data of the user payment service falls within a service indicator range; a location acquisition unit, configured to: if the service data does not fall within the service indicator range, obtain location information of a target customer corresponding to the service data; a parsing unit, configured to obtain one or more local events corresponding to the location information; and an alarm unit, configured to determine, based on the one or more local events, whether to give an alarm for the service data.

Optionally, the alarm unit is configured to: determine whether the one or more local events include a predetermined event; and if the one or more local events include a predetermined event, determine, based on the predetermined event, whether to give an alarm for the service data.

Optionally, the alarm unit is further configured to: determine whether a level and/or duration of the predetermined event included in the one or more local events satisfy a predetermined condition; and if the level and/or the duration of the predetermined event included in the one or more local events satisfy the predetermined condition, determine that the service data fluctuates normally, and an alarm is not given for the service data; or if the level and/or the duration of the predetermined event included in the one or more local events do not satisfy the predetermined condition, determine that the service data is abnormal, and give an alarm for the service data.

Optionally, the alarm unit is further configured to: if the one or more local events do not include the predetermined event, give an alarm for the service data; or suspend the user payment service.

Optionally, the predetermined event includes: natural disasters, traffic control and/or parades.

Optionally, the apparatus further includes a generation unit, configured to: if the one or more local events include a predetermined event, generate prompt information based on the predetermined event, and display the prompt information.

Optionally, the apparatus further includes: a searching unit, configured to search and obtain local news corresponding to the location information; and obtain one or more events of predetermined types from the local news as the one or more local events.

According to a third aspect, an implementation of the present specification further provides a computer readable storage medium. The computer readable storage medium stores a computer program, and the program is executed by a processor to implement the following steps: obtaining service data of a user payment service and determining whether the service data of the user payment service falls within a service indicator range; if the service data does not fall within the service indicator range, obtaining location information of a target customer corresponding to the service data; obtaining one or more local events corresponding to the location information; and determining, based on the one or more local events, whether to give an alarm for the service data.

According to a fourth aspect, an implementation of the present specification provides an electronic device, including a memory and one or more programs, where the one or more programs are stored in the memory, and one or more processors are configured to execute the one or more programs that include instructions for performing the following operations: obtaining service data of a user payment service and determining whether the service data of the user payment service falls within a service indicator range; if the service data does not fall within the service indicator range, obtaining location information of a target customer corresponding to the service data; obtaining one or more local events corresponding to the location information; and determining, based on the one or more local events, whether to give an alarm for the service data.

The previous one or more technical solutions in the implementations of the present specification have at least the following technical effects:

The implementations of the present specification provide a service data processing method. Service data of a user payment service is obtained, and whether the service data falls within a service indicator range is determined. If the service data does not fall within the service indicator range, location information of a target customer corresponding to the service data is obtained, and one or more local events corresponding to the location information are obtained. Then, it is determined, based on the obtained local event, whether to give an alarm for the service data. That is, the one or more local events are used to perform secondary check on the service data. Many local events such as typhoons, terrorist attacks, or power outage cause a payment service fluctuation or even a pause. However, it is normal that service data in this case fails to satisfy the criteria, which does not indicate abnormality. Therefore, performing secondary check on the service data based on the one or more local events effectively avoids incorrectly giving an alarm for a normal fluctuation caused by the one or more local events, alleviates the problem of incorrect alarming based on the service data in the existing technology, and improves alarm accuracy of the payment service data.

BRIEF DESCRIPTION OF DRAWINGS

To describe the technical solutions in the implementations of the present specification more clearly, the following briefly describes the accompanying drawings needed for describing the implementations or the existing technology. Clearly, the accompanying drawings in the following description show merely some implementations of the present specification, and a person of ordinary skill in the art can still derive other drawings from these accompanying drawings without creative efforts.

DESCRIPTION OF IMPLEMENTATIONS

To make the objectives, technical solutions, and advantages of the implementations of the present specification clearer, the following clearly and comprehensively describes the technical solutions in the implementations of the present specification with reference to the accompanying drawings in the implementations of the present specification. Clearly, the described implementations are merely some rather than all of the implementations of the present specification. All other implementations obtained by a person of ordinary skill in the art based on the implementations of the present specification without creative efforts shall fall within the protection scope of the present specification.

Implementations of the present specification provide a service data processing method, apparatus, and an electronic device, so as to implement secondary check on service data of a payment service based on determining of a service indicator range, so as to improve service data alarm accuracy.

With reference to the accompanying drawings, the following describes in detail main implementation principles, specific implementations, and corresponding achievable beneficial effects of the implementations of the present specification.

Figure 1:
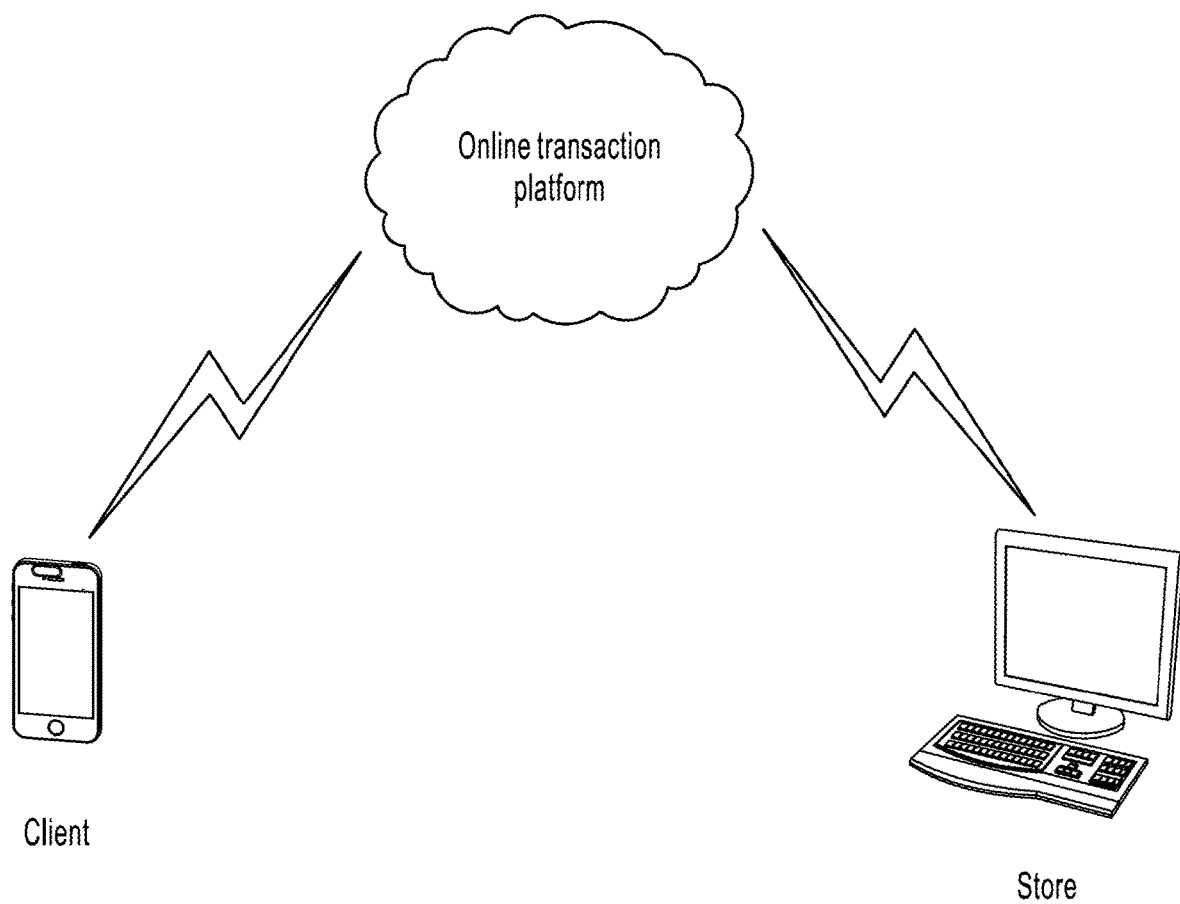
FIG. 1 is a schematic diagram illustrating a payment system, according to an implementation of the present specification.

Referring to FIG. 1, a payment system includes a payment end, a payment receiving end, and a payment service platform. The payment end can initiate a payment request to the payment service platform by scanning a barcode of the payment receiving end, a two-dimensional code of the payment receiving end, or entering account information of the payment receiving end. The payment service platform responds to the payment request of the payment end and feeds back a payment interface, so the payment end completes a payment operation and sends payment information to the payment service platform, and the payment service platform completes a payment service based on the payment information. Certainly, the payment receiving end can also initiate a payment collection request to the payment service platform, and send payment information of the payment end to the payment service platform, so the payment service platform completes a payment service. Payment service needs of both the payment end and the payment receiving end are not fixed, but needs of the payment receiving end, particularly payment receiving ends of merchants are relatively stable, and service data of the payment receiving end can be monitored to determine whether the payment service runs normally.

Figure 2:
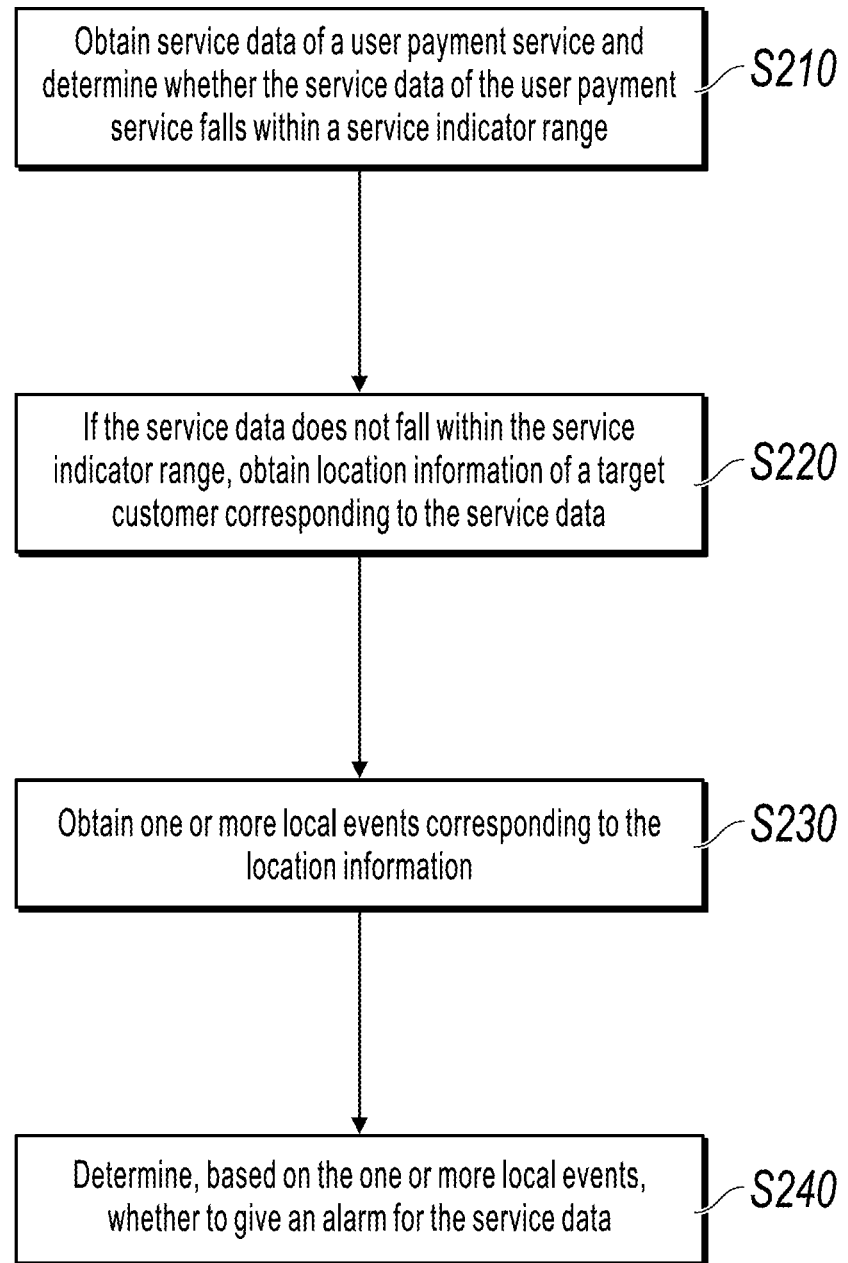
FIG. 2 is a flowchart illustrating a service data processing method, according to an implementation of the present specification.

A service data processing method provided in an implementation of the present specification is applied to a payment service platform to monitor service data of a payment service, and in particular, monitor payment service data of each merchant. Referring to FIG. 2, the service data processing method includes the following steps:

S210. Obtain service data of a user payment service and determine whether the service data of the user payment service falls within a service indicator range.

S220. If the service data does not fall within the service indicator range, obtain location information of a target customer corresponding to the service data.

S230. Obtain one or more local events corresponding to the location information.

S240. Determine, based on the one or more local events, whether to give an alarm for the service data.

In actual application processes, during the monitoring of a payment service of a certain merchant, service data of a future time point can be predicted based on the customer's historical payment service data to obtain a service indicator range of the time point. A specific prediction method can use an existing prediction method, such as prediction based on average values, changing trends of data over time, and time sequence analysis prediction method. The prediction method of the service indicator range is not limited in this implementation. The service indicator range can be a total payment amount, the quantity of payment times, payment frequency, etc. of a merchant, a store, etc. within a predetermined time period, such as one day, one week, or one month.

In S210, the service data of the user payment service can be obtained by using a payment service platform, or can be obtained by using clients (including a payment end and a payment receiving end). The service data can include a total payment amount, the quantity of payment times, payment frequency, payment locations, etc. in a predetermined time period. After the service data of the user payment service is obtained, it is determined whether the service data falls within the service indicator range. For example, if a store predicts, based on historical service data of a previous month, that an average daily payment amount of the last week in the current month of the store is RMB 30,000 to RMB 40,000, at the end of the last week in the current month, service data of the week, that is, the actual average daily payment amount, is obtained, and it is determined whether the actual payment amount is from RMB 30,000 to RMB 40,000. If it is determined that the service data falls within the service indicator range, it indicates that the user payment service is normal, and subsequent monitoring is continued. Otherwise, if it is determined that the service data does not fall within the service indicator range, S220 is performed.

In S220, if the service data does not fall within the service indicator range, the location information of the target customer corresponding to the service data is obtained. Specifically, the location information stored in advance can be obtained by using the payment service platform or a client, or location information of a mobile client can be obtained based on a location based service (LBS) by using a radio communications network (such as a GSM network or a CDMA network) or an external positioning method (such as a GPS) of a mobile communications operator.

After the location information of the target customer is obtained, S230 continues to be performed to obtain the one or more local events corresponding to the location information. Local news corresponding to the location information can be obtained by searching. One or more events of predetermined types can be obtained from the corresponding local news as the one or more local events. Events of the predetermined types include events with significant impact such as traffic, weather, municipal administration, and electric power. Specifically, when the one or more local events are obtained, a third-party application such as the browser of GOOGLE, 360, or BAIDU can be invoked to search for local news based on the address of the location information, to obtain the latest and the hottest headline newsletter and obtain the one or more local events based on the newsletter.

After the one or more local events are obtained, S240 continues to be performed to determine, based on the one or more local events, whether to give an alarm for the service data. Specifically, whether the one or more local events include the predetermined event can be first determined. If the one or more local events include the predetermined event, it is determined, based on the predetermined event, whether to give an alarm for the service data. The predetermined event is an event that cannot be reversed by using payment technical means or an event caused by a force majeure factor, and includes one or more events such as a natural disaster, traffic control, a parade, or municipal construction. Different local events have different impacts on the payment service. A common event such as a temporary power outage or heavy rain does not pose great impact on the payment service. A predetermined event such as a typhoon, a parade, or a snowstorm poses great impact on the payment service. However, these events are caused by force majeure factors. It is normal to cause abnormal service data, and no technician needs to follow up. When the force majeure factor disappears, the corresponding service naturally recovers to normal. When determining whether to give an alarm, if the one or more local events do not include these predetermined events, it indicates that the payment service of the target customer is abnormal, and an alarm is given for the service data of the target customer, so maintenance personnel can follow up; or the corresponding user payment service is suspended, and is re-enabled after the maintenance personnel follow up and solve the problem. On the contrary, if the one or more local events include a predetermined event, no alarm is given for the service data of the one or more local events, prompt information is generated based on an obtained predetermined time, and the prompt information is displayed, to remind the maintenance personnel that a corresponding event occurs locally and the maintenance personnel can continue to observe the one or more local events and do not contact the target customer at this time, so as to avoid disturbing the customer and bring poor experience to the customer.

For example, an artificial intelligence supervised learning module is used to determine whether the one or more local events include a predetermined event, such as a typhoon, an earthquake, a power outage, a snowstorm, or a rainstorm. If the determining result is yes, the system outputs 1 and gives no alarm, or if the determining result is no, the system outputs 0 and gives an alarm. The maintenance personnel or assurance specialists follow up the alarm, and after determining that the payment system is normal, follow up with the customer, confirm with merchant and solve the problem. When the system outputs 1, a temporary workaround can be used, the prompt information and predetermined events corresponding to the latest top 10 newsletters can be returned to a prompt notification, and the monitoring personnel manually determine whether to follow up.

To avoid a missing report, when it is determined that the one or more local events include the predetermined event, it is further determined, based on a level and/or duration of the included predetermined event, whether to give an alarm for the service data. Specifically, it is determined whether the level and/or the duration of the predetermined event included in the one or more local events satisfy a predetermined condition. The predetermined condition is a level and/or duration of a predetermined event that causes a relatively large fluctuation to the payment service. For example, a predetermined condition corresponding to a typhoon event is that a level exceeds level 5 and/or duration exceeds 2 days. If the level and/or the duration of the predetermined event included in the one or more local events satisfy the predetermined condition, it is determined that the service data fluctuates normally, and no alarm is given for the service data; or if the level and/or the duration of the predetermined event included in the one or more local events do not satisfy the predetermined condition, it is determined that the service data is abnormal, and an alarm is given for the service data.

When an abnormal service event is triggered, a monitoring and alarming system of the user payment service obtains the location information of the user, uses a service interface such as LBS News near you to obtain the latest hot news, analyzes newsletter content by using the artificial intelligence supervised learning module, and determines whether there are one or more local events that affect the local real-world payment service. If there are one or more local events that affect the local real-world payment service, no alarm is triggered (or alarm importance or sensitivity is reduced, and a low-level alarm is generated). As such, merchants in extreme local scenarios are not disturbed, and operation and maintenance efficiency is improved, so limited personnel are concentrated on issues that really need to be solved, and operation and maintenance costs are reduced.

Figure 3:
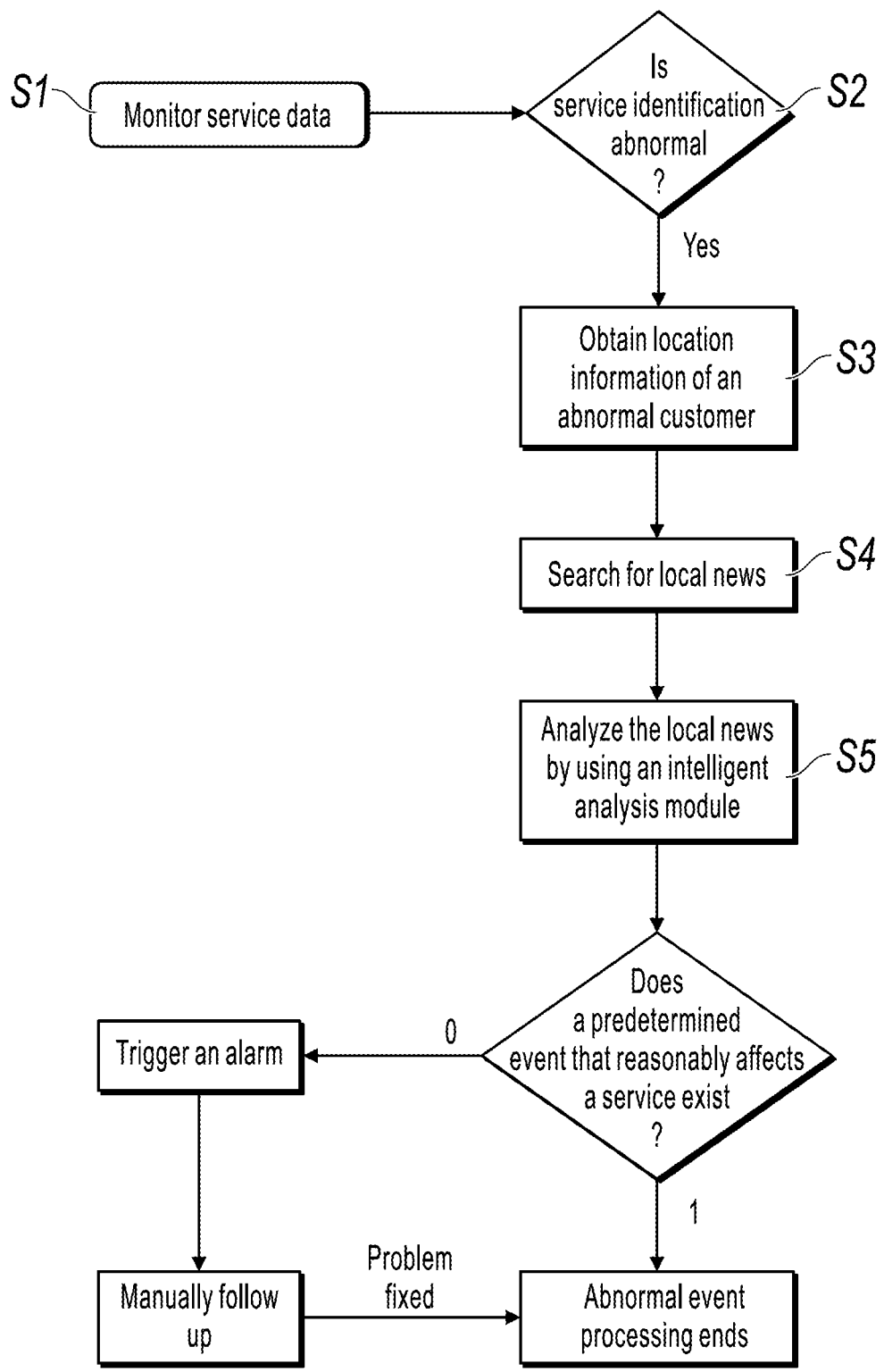
FIG. 3 is a flowchart illustrating a payment service monitoring and alarming system, according to an implementation of the present specification.

Referring to FIG. 3, the following describes a detailed implementation process of a service data processing method provided in the present specification in a monitoring service by using a specific example.

S1. Monitor service data of a user payment service by using an intelligent monitoring and alarming module. The intelligent monitoring and alarming module can be connected to the payment service platform and a payment service client, and obtain corresponding service data.

S2. Determine whether a service indicator is abnormal, that is, whether the service data exceeds a service indicator range. If yes, continue monitoring. If no, proceed to the next step S3.

S3. Obtain, by using an LBS, location information of a target customer corresponding to the service data that exceeds the service indicator range.

S4. Invoke an LBS-based search service interface to search for local news corresponding to the location information.

S5. Analyze the local news by using an intelligent analysis module.

S6. Determine whether there is a predetermined event that reasonably affects a local payment service. If there are predetermined events such as typhoons, rainstorms, and riots, output 1, and abnormal event processing ends. If no, output 0 and trigger an alarm. Then the alarm is manually followed up until the service problem is fixed, and abnormal event processing ends.

Figure 4:
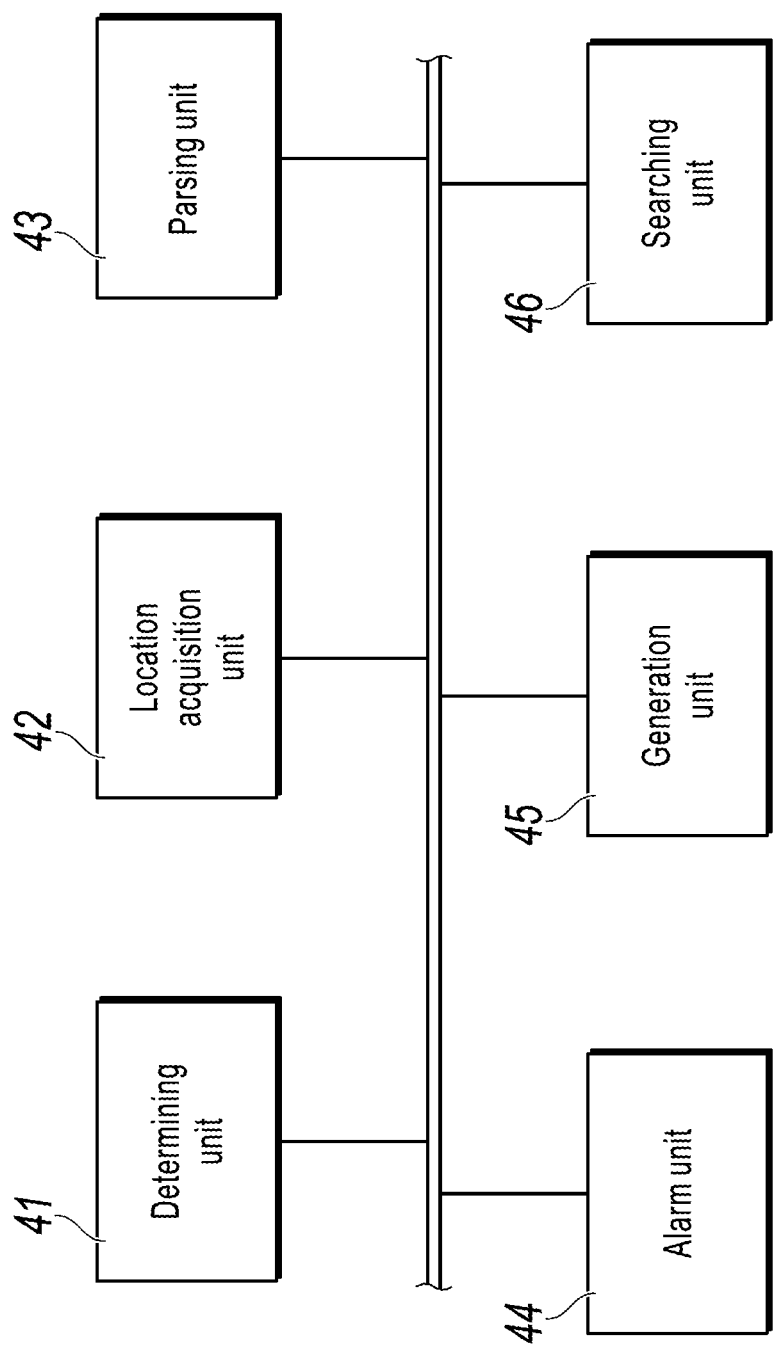
FIG. 4 is a schematic diagram illustrating an information processing apparatus, according to an implementation of the present specification.

Based on the service data processing method provided in the previous implementation, this implementation further provides a corresponding service data processing apparatus. Referring to FIG. 4, the apparatus includes: a determining unit 41, configured to obtain service data of a user payment service and determine whether the service data of the user payment service falls within a service indicator range; a location acquisition unit 42, configured to: if the service data does not fall within the service indicator range, obtain location information of a target customer corresponding to the service data; a parsing unit 43, configured to obtain one or more local events corresponding to the location information; and an alarm unit 44, configured to determine, based on the one or more local events, whether to give an alarm for the service data.

In an optional implementation, the alarm unit 44 can determine whether the one or more local events include a predetermined event when determining whether to give an alarm for the service data that exceeds the service indicator range; and if the one or more local events include a predetermined event, determine, based on the predetermined event, whether to give an alarm for the service data. The predetermined event can include: natural disasters, traffic control and/or parades.

Specifically, the alarm unit 44 can determine whether a level and/or duration of the predetermined event included in the one or more local events satisfy a predetermined condition; and if the level and/or the duration of the predetermined event included in the one or more local events satisfy the predetermined condition, determine that the service data fluctuates normally, and an alarm is not given for the service data; or if the level and/or the duration of the predetermined event included in the one or more local events do not satisfy the predetermined condition, determine that the service data is abnormal, and give an alarm for the service data.

In an optional implementation, the alarm unit 44 is further configured to: if the one or more local events do not include the predetermined event, give an alarm for the service data; or suspend the user payment service.

In an optional implementation, the apparatus further includes: a generation unit 45, configured to: if the one or more local events include a predetermined event, generate prompt information based on the predetermined event, and display the prompt information. Optionally, the apparatus can further include a searching unit 46, configured to search and obtain local news corresponding to the location information; and obtain one or more events of predetermined types from the local news as the one or more local events.

This implementation provides a service data processing apparatus. A determining unit obtains service data of a user payment service, and determines whether the service data falls within a service indicator range. If the service data does not fall within the service indicator range, a location acquisition unit obtains location information of a target customer corresponding to the service data, and an analysis unit obtains one or more local events corresponding to the location information. Then, an alarm unit determines, based on the obtained local event, whether to give an alarm for the service data. That is, the one or more local events are used to perform secondary check on the service data. Many local events such as typhoons, terrorist attacks, or power outage cause a payment service fluctuation or even a pause. However, it is normal that service data in this case fails to satisfy the criteria, which does not indicate abnormality. Therefore, performing secondary check on the service data based on the one or more local events effectively avoids incorrectly giving an alarm for a normal fluctuation caused by the one or more local events, alleviates the problem of incorrect alarming based on the service data in the existing technology, and improves alarm accuracy of the payment service data.

With regard to the apparatus in the above implementations, the specific methods for performing operations by the units have been described in detail in the implementations relating to the method, and details are omitted here for simplicity.

Figure 5:
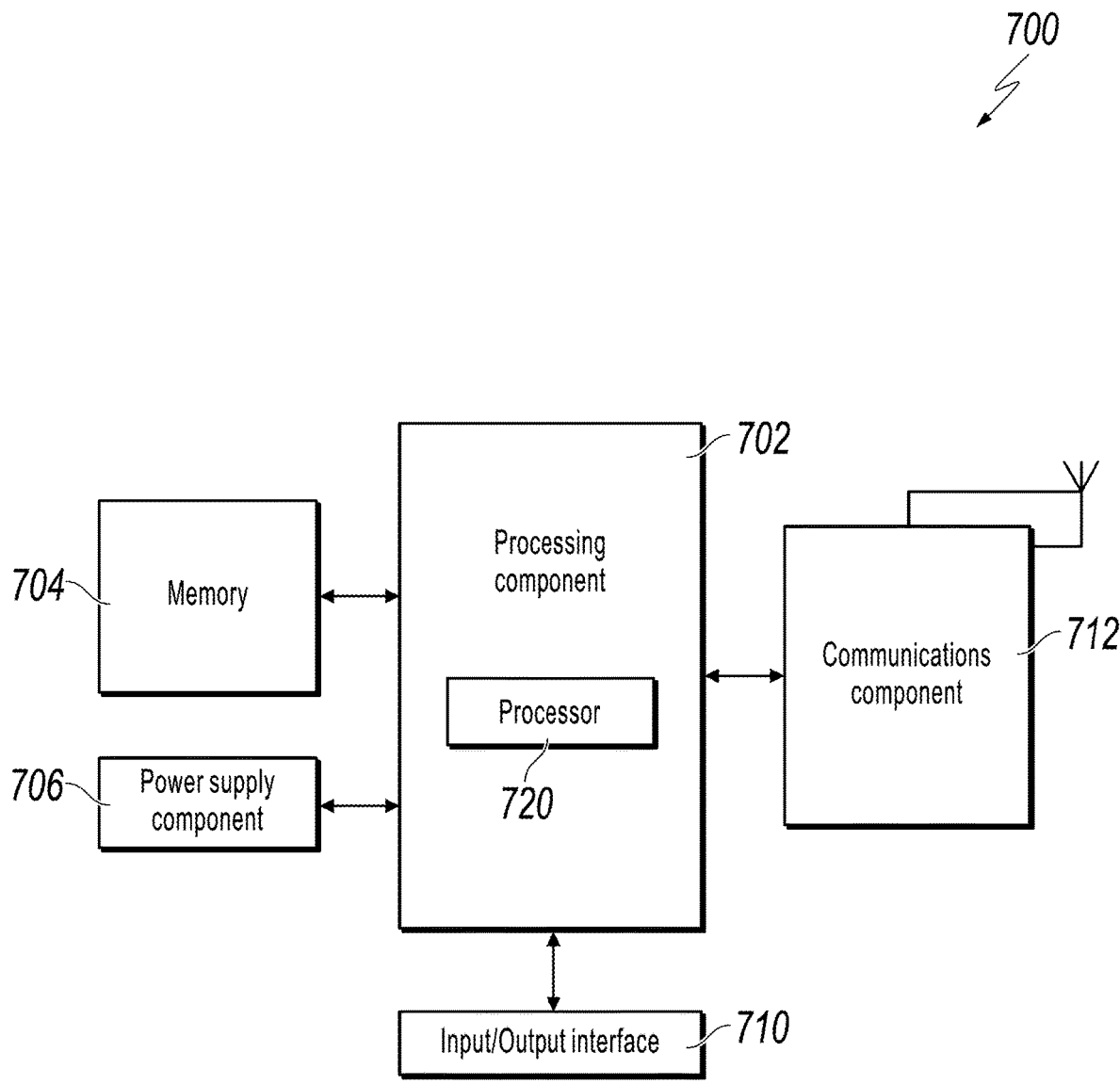
FIG. 5 is a schematic diagram illustrating an electronic device, according to an implementation of the present application.

Referring to FIG. 5, FIG. 5 is a block diagram illustrating an electronic device 700 for implementing a data query method, according to an example implementation. For example, the electronic device 700 can be a computer, a database console, a tablet device, a personal digital assistant, etc.

Referring to FIG. 5, the electronic device 700 can include one or more of the following components: a processing component 702, a memory 704, a power supply component 706, a multimedia component 708, an input/output (I/O) interface 710, and a communications component 712.

The processing component 702 generally controls the overall operation of the electronic device 700, such as operations associated with display, data communication, and recording operations. The processing component 702 can include one or more processors 720 to execute instructions to complete all or a part of the steps of the previous method. In addition, the processing component 702 can include one or more modules to facilitate interaction between the processing component 702 and other components.

The memory 704 is configured to store various types of data to support operations at the device 700. Examples of these data include instructions, contact data, address book data, messages, pictures, videos, etc. for any application program or method to operate on the electronic device 700. The memory 704 can be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply component 706 provides power for various components of the electronic device 700. The power supply component 706 can include a power supply management system, one or more power supplies, and other components associated with generating, managing, and allocating power to the electronic device 700.

The I/O interface 710 provides an interface between the processing component 702 and a peripheral interface module. The peripheral interface module can be a keyboard, a click wheel, a button, etc. These buttons can include but are not limited to: a home page button, a volume button, a start button, and a lock button.

The communications component 712 is configured to facilitate wired or wireless communication between the electronic device 700 and other devices. The electronic device 700 can access a wireless network based on a communications standard, such as Wi-Fi, 2G or 3G, or a combination thereof. In an example implementation, the communications component 712 receives a broadcast signal or broadcast-related information from an external broadcast management system via a broadcast channel. In an example implementation, the communications component 712 further includes a near field communication (NFC) module to facilitate short range communication. For example, the NFC module can be implemented based on a radio frequency identification (RFID) technology, an infrared data association (IrDA) technology, an ultra-wideband (UWB) technology, a Bluetooth (BT) technology, and another technology.

In an example implementation, the electronic device 700 can be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, to perform the previous methods.

In an example implementation, a non-temporary computer readable storage medium including instructions is further provided, such as the memory 704 including instructions, and the instructions can be executed by the processor 720 of the electronic device 700 to complete the method. For example, the non-temporary computer readable storage medium can be a ROM, a random access memory (RAM), a CD-ROM, a magnetic tape, a floppy disk, an optical data storage device, etc.

A non-temporary computer readable storage medium is provided, and when instructions in the storage medium are executed by a processor of a mobile terminal, an electronic device can be enabled to execute a data query method, where the method includes:

obtaining service data of a user payment service and determining whether the service data of the user payment service falls within a service indicator range; if the service data does not fall within the service indicator range, obtaining location information of a target customer corresponding to the service data; obtaining one or more local events corresponding to the location information; and determining, based on the one or more local events, whether to give an alarm for the service data.

It should be understood that the present disclosure is not limited to the precise structures that have been described above and shown in the drawings, and various modifications and changes can be made without departing from the scope of the present disclosure. The scope of the present disclosure is limited by the appended claims only.

The previous descriptions are merely preferred implementations of the present disclosure, but are not intended to limit the present disclosure. Any modification, equivalent replacement, or improvement made without departing from the spirit and principle of the present disclosure shall fall within the protection scope of the present disclosure.

What is claimed is:

1. A service data processing method, wherein the method comprises:
    obtaining, using one or more computing devices, service data of a merchant payment service associated with a target merchant;
    determining, using the one or more computing devices, whether the service data of the merchant payment service falls within a service indicator range;
    in response to determining that the service data does not fall within the service indicator range, obtaining, using the one or more computing devices, location information of the target merchant corresponding to the service data;
    obtaining, using the one or more computing devices, one or more local events corresponding to the location information;
    determining, using the one or more computing devices and based on the one or more local events, whether to output an alarm for the service data of the merchant payment service, wherein the alarm indicates that the merchant payment service is abnormal and that abnormality of the merchant payment service requires further investigation; and in response to determining to output the alarm for the service data of the merchant payment service, outputting, using the one or more computing devices, the alarm for the service data of the merchant payment service.

2. The method according to claim 1, wherein determining whether to output the alarm for the service data comprises:
   determining whether the one or more local events comprises a predetermined event; and
   in response to determining that the one or more local events comprises the predetermined event, determining, based on the predetermined event, whether to output the alarm for the service data.

3. The method according to claim 2, wherein determining whether to output the alarm for the service data comprises:
   determining whether at least one of a level of the predetermined event or a duration of the predetermined event satisfies a predetermined condition, wherein the one or more local events comprises at least one of the level of the predetermined event or the duration of the predetermined event;
   in response to a determination that at least one of the level of the predetermined event or the duration of the predetermined event satisfies the predetermined condition, determining that the service data fluctuates normally and determining not to output the alarm for the service data; and
   in response to a determination that at least one of the level of the predetermined event or the duration of the predetermined event does not satisfy the predetermined condition, determining that the service data is abnormal and determining to output the alarm for the service data.

4. The method according to claim 2, wherein the method further comprises:
   in response to determining that the one or more local events does not comprise the predetermined event:
   outputting the alarm for the service data; or
   suspending the merchant payment service.

5. The method according to claim 2, wherein the predetermined event comprises at least one of:
   a natural disaster, a traffic control, or a parade.

6. The method according to claim 1, wherein the method further comprises:
   in response to determining not to output the alarm for the service data:
   generating prompt information based on the one or more local events; and
   displaying the prompt information.

7. The method according to claim 1, wherein the method further comprises:
   searching and obtaining local news corresponding to the location information; and
   obtaining one or more events of predetermined types from the local news as the one or more local events.

8. A non-transitory, computer-readable medium storing one or more instructions executable by a computer system to perform operations comprising:
   obtaining, using one or more computing devices, service data of a merchant payment service associated with a target merchant;
   determining, using the one or more computing devices, whether the service data of the merchant payment service falls within a service indicator range;
   in response to determining that the service data does not fall within the service indicator range, obtaining, using the one or more computing devices, location information of the target merchant corresponding to the service data;
   obtaining, using the one or more computing devices, one or more local events corresponding to the location information;
   determining, using the one or more computing devices and based on the one or more local events, whether to output an alarm for the service data of the merchant payment service, wherein the alarm indicates that the merchant payment service is abnormal and that abnormality of the merchant payment service requires further investigation; and
   in response to determining to output the alarm for the service data of the merchant payment service, outputting, using the one or more computing devices, the alarm for the service data of the merchant payment service.

9. The non-transitory, computer-readable medium according to claim 8, wherein determining whether to output the alarm for the service data comprises:
   determining whether the one or more local events comprises a predetermined event; and
   in response to determining that the one or more local events comprises the predetermined event, determining, based on the predetermined event, whether to output the alarm for the service data.

10. The non-transitory, computer-readable medium according to claim 9, wherein determining whether to output the alarm for the service data comprises:
    determining whether at least one of a level of the predetermined event or a duration of the predetermined event satisfies a predetermined condition, wherein the one or more local events comprises at least one of the level of the predetermined event or the duration of the predetermined event;
    in response to a determination that at least one of the level of the predetermined event or the duration of the predetermined event satisfies the predetermined condition, determining that the service data fluctuates normally and determining not to output the alarm for the service data; and
    in response to a determination that at least one of the level of the predetermined event or the duration of the predetermined event does not satisfy the predetermined condition, determining that the service data is abnormal and determining to output the alarm for the service data.

11. The non-transitory, computer-readable medium according to claim 9, wherein the operations further comprise:
    in response to determining that the one or more local events does not comprise the predetermined event:
    outputting the alarm for the service data; or
    suspending the merchant payment service.

12. The non-transitory, computer-readable medium according to claim 9, wherein the predetermined event comprises at least one of:
    a natural disaster, a traffic control, or a parade.

13. The non-transitory, computer-readable medium according to claim 8, wherein the operations further comprise:
    in response to determining not to output the alarm for the service data:

generating prompt information based on the one or more local events; and
displaying the prompt information.

14. The non-transitory, computer-readable medium according to claim 8, wherein the operations further comprise:
searching and obtaining local news corresponding to the location information; and
obtaining one or more events of predetermined types from the local news as the one or more local events.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, using one or more computing devices, service data of a merchant payment service associated with a target merchant;
determining, using the one or more computing devices, whether the service data of the merchant payment service falls within a service indicator range;
in response to determining that the service data does not fall within the service indicator range, obtaining, using the one or more computing devices, location information of the target merchant corresponding to the service data;
obtaining, using the one or more computing devices, one or more local events corresponding to the location information;
determining, using the one or more computing devices and based on the one or more local events, whether to output an alarm for the service data of the merchant payment service, wherein the alarm indicates that the merchant payment service is abnormal and that abnormality of the merchant payment service requires further investigation; and
in response to determining to output the alarm for the service data of the merchant payment service, outputting, using the one or more computing devices, the alarm for the service data of the merchant payment service.

16. The computer-implemented system according to claim 15, wherein determining whether to output the alarm for the service data comprises:
determining whether the one or more local events comprises a predetermined event; and
in response to determining that the one or more local events comprises the predetermined event, determining, based on the predetermined event, whether to output the alarm for the service data.

17. The computer-implemented system according to claim 16, wherein determining whether to output the alarm for the service data comprises:
determining whether at least one of a level of the predetermined event or a duration of the predetermined event satisfies a predetermined condition, wherein the one or more local events comprises at least one of the level of the predetermined event or the duration of the predetermined event;
in response to a determination that at least one of the level of the predetermined event or the duration of the predetermined event satisfies the predetermined condition, determining that the service data fluctuates normally and determining not to output the alarm for the service data; and
in response to a determination that at least one of the level of the predetermined event or the duration of the predetermined event does not satisfy the predetermined condition, determining that the service data is abnormal and determining to output the alarm for the service data.

18. The computer-implemented system according to claim 16, wherein the operations further comprise:
in response to determining that the one or more local events does not comprise the predetermined event:
outputting the alarm for the service data; or
suspending the merchant payment service.

19. The computer-implemented system according to claim 16, wherein the predetermined event comprises at least one of:
a natural disaster, a traffic control, or a parade.

20. The computer-implemented system according to claim 15, wherein the operations further comprise:
in response to determining not to output the alarm for the service data:
generating prompt information based on the one or more local events; and
displaying the prompt information.

* * * * *